Figure 1:
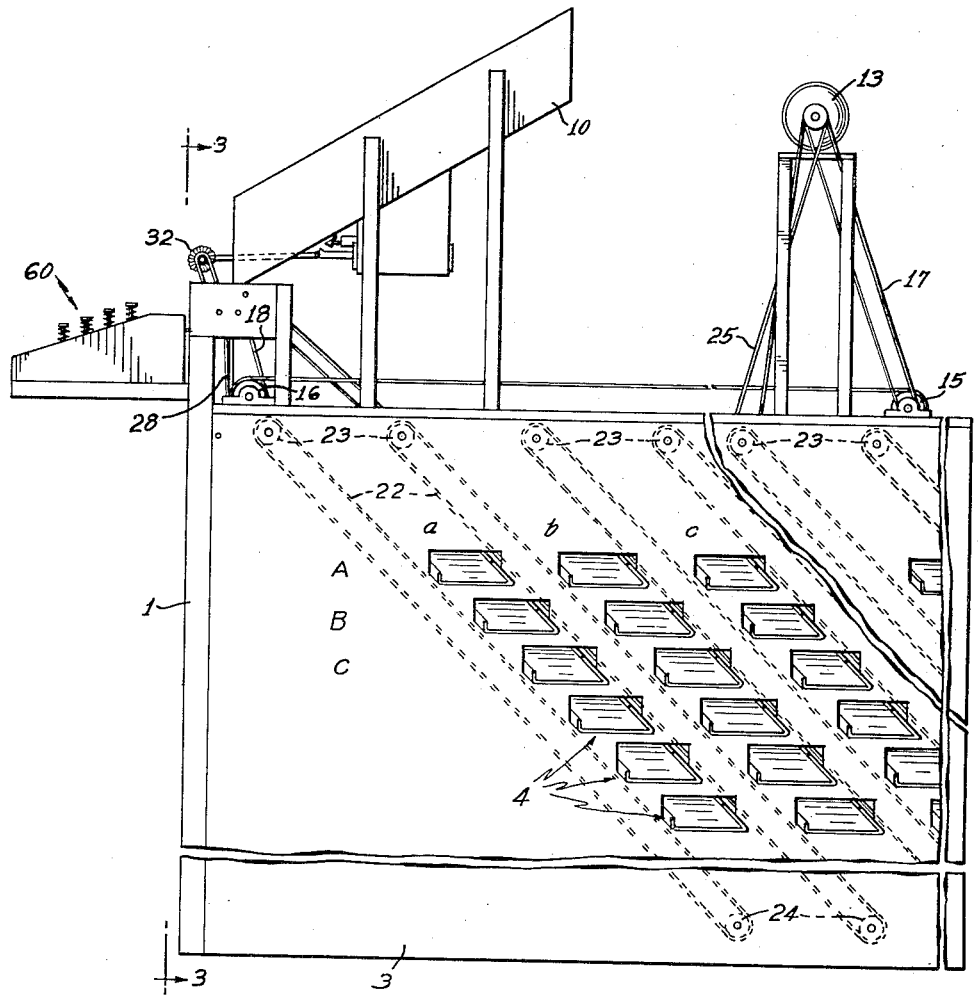

Aug. 7, 1956  F. C. GLEASON  2,758,163
ACTUATING MECHANISM FOR SORTING MACHINE
Original Filed Jan. 18, 1949  8 Sheets-Sheet 1

Inventor
Frederick C. Gleason

By Pennie, Edmonds, Morton, Barrows & Taylor

ATTORNEY

Aug. 7, 1956 F. C. GLEASON 2,758,163
ACTUATING MECHANISM FOR SORTING MACHINE
Original Filed Jan. 18, 1949 8 Sheets-Sheet 3

INVENTOR.
Frederick C. Gleason
BY
Pennie, Edmonds, Morton, Barrows & Taylor
ATTORNEYS Aug. 7, 1956 F. C. GLEASON 2,758,163
ACTUATING MECHANISM FOR SORTING MACHINE
Original Filed Jan. 18, 1949 8 Sheets-Sheet 7

Inventor
Frederick C. Gleason

By
Pennie, Edmonds, Morton, Barrows & Taylor
ATTORNEY

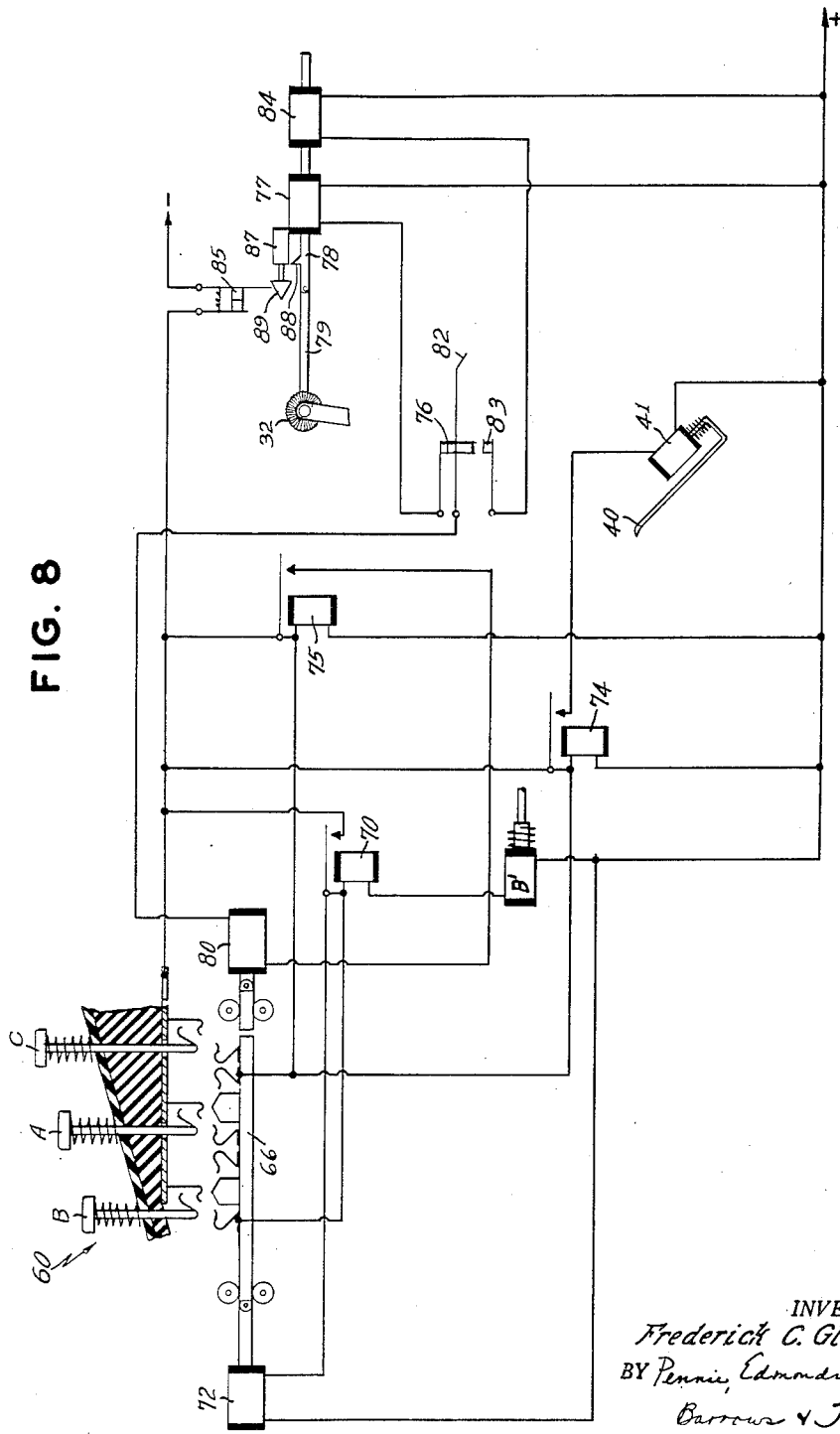

United States Patent Office 2,758,163
Patented Aug. 7, 1956

2,758,163

ACTUATING MECHANISM FOR SORTING MACHINE

Frederick C. Gleason, Wilton, Conn., assignor to Mailsort Incorporated, New York, N. Y., a corporation of New York Original application January 18, 1949, Serial No. 71,408. Divided and this application January 21, 1953, Serial No. 332,314

5 Claims. (Cl. 200—5)

This application is a division of my copending application Ser. No. 71,408, filed January 18, 1949 now Patent No. 2,656,054 issued October 20, 1953.

This invention relates to sorting machines and more particularly to a machine for sorting articles such as letters, sales slips, bills of lading and the like, adapted to be operated automatically in accordance with the printed material contained on the article faces. More specifically the invention relates to such a machine which is so constructed that it may be used in series with one or more identical machines to deliver the sorted articles to common collection places.

Machines for automatically sorting articles according to the printed material contained thereon are old in the art, but none has been invented that may be used in a battery of like machines for materially decreasing the number of collection points required, nor in fact has any been developed that possesses the superior and distinguishing characteristics of that which is the subject of this invention. Additionally, significant commercial success has been accorded none.

In its broadest aspects, the present invention contemplates an electrically operated machine having a number of compartments or chutes into which are to be sorted articles, and belt driving and conveying means for conveying such letters and the like to the various chutes. The various electrical circuits of the machine are adapted to be actuated from a keyboard similar in the arrangement of the keys to that of a standard typewriter keyboard. The operator of the machine need merely note a certain number, for example two, characters in the printed matter of the article to be sorted, operate the corresponding keys on the keyboard and the letter will be routed to the proper chute without further attention from the operator. It is contemplated that the only restriction of the speed with which articles may be sorted is the speed with which the operator can scan the pertinent printed matter and operate the keyboard, the speed of the belt conveying means being of such magnitude that it is in no way restrictive with respect to the speed of storting. The construction of the machine, and particularly the chutes, is such that any number of machines may be placed side by side and the articles, sorted by each, conveyed through the chutes of the machines on one side thereof to common collection points for all of the machines in a group.

More specifically the present invention contemplates a sorting machine mounted on a suitable framework and having a plurality of chutes, the number of such chutes depending only upon the number of different categories into which it is desired to sort the articles to be sorted. Each chute comprises a base portion and a back wall which confine the article, delivered, to the chute. It has no side or front walls, except for, perhaps, a lip along the front edge of its base, the front wall being necessarily omitted to provide means for entrance of the article. The chutes are all inclined at an angle sufficient to cause the article delivered to any one of them to slide, because of gravitational force, out endwise therefrom. Additionally, the chutes are arranged in generally vertical rows longitudinally of the machines, corresponding ones in each generally vertical row being at the same horizontal level.

The feeding and conveying means of the sorting machine comprise a series of power driven conveyor belts all preferably and most economically driven from a single source of driving power. A swinging rotary feed mechanism takes a single article from the source of supply, passes it on to generally vertically disposed initial feed belts from which it is received by horizontal feed belts so disposed as to pass above the generally vertical rows of chutes. A solenoid-operated trap is provided for each of the generally vertical rows of chutes and, according to the desires of the operator of the machine, one of these intercepts the article during its horizontal travel and diverts it into one of the generally vertical rows. Each of these rows is itself provided with a positive conveying means inclined at the same angle as is its respective generally vertical row of chutes. This conveyor, again comprising positively driven belts, receives the article at the point of its diversion from its horizontal path of travel by the above-mentioned solenoid-operated trap. It conveys the article downwardly along the generally vertical row of chutes past the front, substantially open sides of the chutes. Each chute is provided with a solenoid-operated trap which is adapted to divert the article from the generally vertical conveying means into the chute. The operation of these traps is also controlled by the operator of the machine. The article is thus delivered to a particular chute.

While each of the traps for diverting the articles from their horizontal paths of travel into one of the generally vertical paths is operated of necessity by a separate solenoid, the chute traps are so designed that a single solenoid may be used for the operation of all of those in one horizontal row. Thus the number of solenoids required for operating the traps is equal to the number of inclined rows of chutes plus the number of horizontal rows.

Associated with the swinging rotary feed mechanism is a counter-rotating wiper which, in cooperation with a feed cut-off trigger mechanism, insures the feed of but a single article to the sorting machine during one operation thereof.

The various electrical circuits for operating the trap-operating solenoids, as well as solenoids used in operating the swinging rotary feed mechanism, are controlled and actuated by a keyboard similar in arrangement of letters of the alphabet and numerals to that of any standard typewriter keyboard. The keys are connected to one pole of a source of electric current and each forms one half of a make-and-break electric switch. The other halves of the make-and-break switches are carried by a reciprocable member positioned beneath the keyboard and adapted to assume either of two positions with respect to the keyboard depending upon the operation of the keyboard.

As pointed out above, the sorting machine of the present invention is intended to be operated according to the printed matter carried on the face of the article to be sorted, certain characters of the printed matter when typed on the keyboard serving to determine to which of the plurality of chutes the article is to be delivered. The electrical circuit setup of the machine herein disclosed has been designed to operate the machine and sort articles according to any two distinguishing characters of the printed matters. For instance, in sorting mail the two first letters of the street name in the address may serve as the distinguishing characters. However, it is contemplated that the electrical system with obvious modifications may be adapted to operate the machine in accordance with three, four or more distinguishing characters and the fact that two have here been chosen for illustrative purposes is not to be construed as limiting.

For this reason the electrical operating system of the sorting machine disclosed and described herein, comprises essentially two major sets of circuits. One of the first of these is completed when the first key of the keyboard, corresponding to the first distinguishing character of the printed matter, is depressed, the key being returned to its original position by a spring return, but the circuit so completed being maintained by a relay. The completion of this circuit energizes one of the trap-operating solenoids, depending upon which key is pressed, for one of the horizontal rows of chutes serving to set up all of the traps of the chutes of that particular row. The completion of this circuit also energizes a solenoid provided to move the reciprocable member forming the other halves of the keyboard make-and-break switches in one direction, setting this member up for the subsequent depression of a second key of the keyboard; whether it be the same key as first depressed or a different one is immaterial to the operation of the machine as provision is necessarily made in this manner to meet the possibility of the two distinguishing characters of the printed matter according to which the machine is operated being the same. This first circuit is maintained by means of the above-mentioned relay until broken as will be subsequently described.

One of the second major set of circuits is completed when the key of the keyboard, corresponding to the second distinguishing character of the printed matter is depressed, this key also being returned to its rest position by a spring return but the circuit so completed being maintained by a relay. The completion of this circuit accomplishes several things. It first of all energizes one of the solenoids which sets up one of the traps serving to intercept and divert an article carried by the horizontal conveying means to a generally vertical conveying means. It also energizes a solenoid to return the reciprocable keyboard member to its original position. This circuit too is maintained by its relay until broken at the same time as is the first-mentioned circuit. The second major circuit established also serves to operate the swinging rotary feed mechanism through a secondary circuit. The secondary circuit when so established causes the swinging rotary feed mechanism to feed an article from the article supply to the machine by energizing a solenoid which swings such mechanism into operating position. As the article passes between the initial feed belt conveying means it, however, flicks a trigger switch mechanism, breaking this secondary circuit and making a tertiary circuit. The letter-contacting part of the trigger switch mechanism is so positioned with respect to the letter-contacting portion of the swinging rotary feed mechanism that the distance therebetween is less than the width of the narrowest article to be sorted. The tertiary circuit energizes another solenoid which returns the swinging rotary feed mechanism to its inoperative position and because of the spacing of the trigger switch and the feed mechanism does so before a second article can be fed. At the same time, the last-mentioned solenoid sets a dash pot or time-delay mechanism for breaking both the first and second major circuits previously established by the operation of the keys of the keyboard. The time-delay device is set, of course, for the length of time required for an article to be delivered from the article source to the chutes farthest away therefrom, this setting of the time-delay device therefore allowing sufficient time for the delivery of articles to any intermediate chute also.

As pointed out, the chutes comprise bases and back walls and are inclined at such an angle that an article delivered to any one of them will, because of gravitational force, slide out from the end thereof. In addition, the chutes are of such dimensions transversely of the machine that they extend a short distance beyond the body of the machine on each side of it. This construction is provided so that when it is desired to use more than one machine, as is contemplated where there is a large number of articles to be sorted, the machines to be used together may be set side by side in stepped fashion, the chutes of one machine overlapping those of the adjacent machine on the next lower step. Thus the chutes of each machine form portions of longer chutes through which articles from the chutes of the machines on upper steps may pass in being delivered to the common collection points of all machines. It will be clear that the corresponding chutes of the machines of such a group all receive the same type of article, that is, for instance, the X chute of each will receive from the sorting machine of each, articles having been sorted according to the same two distinguishing characters. It will also be clear that the stepped arrangement of machines used as a group is necessary as the delivery of the articles, that have been sorted by each, to common collection points depends upon gravitational force.

The advantages of the sorting machine of the present invention will be obvious. Instead of having to manually sort articles or to even manually collect articles, that have been automatically sorted, from the chutes of each machine, but one collection is now necessary and that is the collection from the common collection points of the group or battery of machines. In the event one machine of a group, being used together requires routine maintenance it may be removed from its position and a spare machine inserted in its place. Thus only one spare machine is needed as all machines are identical. The removal of one will not put the whole group out of commission.

This invention will be further described in connection with the accompanying drawings, which show a preferred embodiment thereof. However it is to be understood that such further and detailed description is merely by way of exemplification and the invention is not limited thereby except to the extent set forth in the appended claims.

Figure 2:
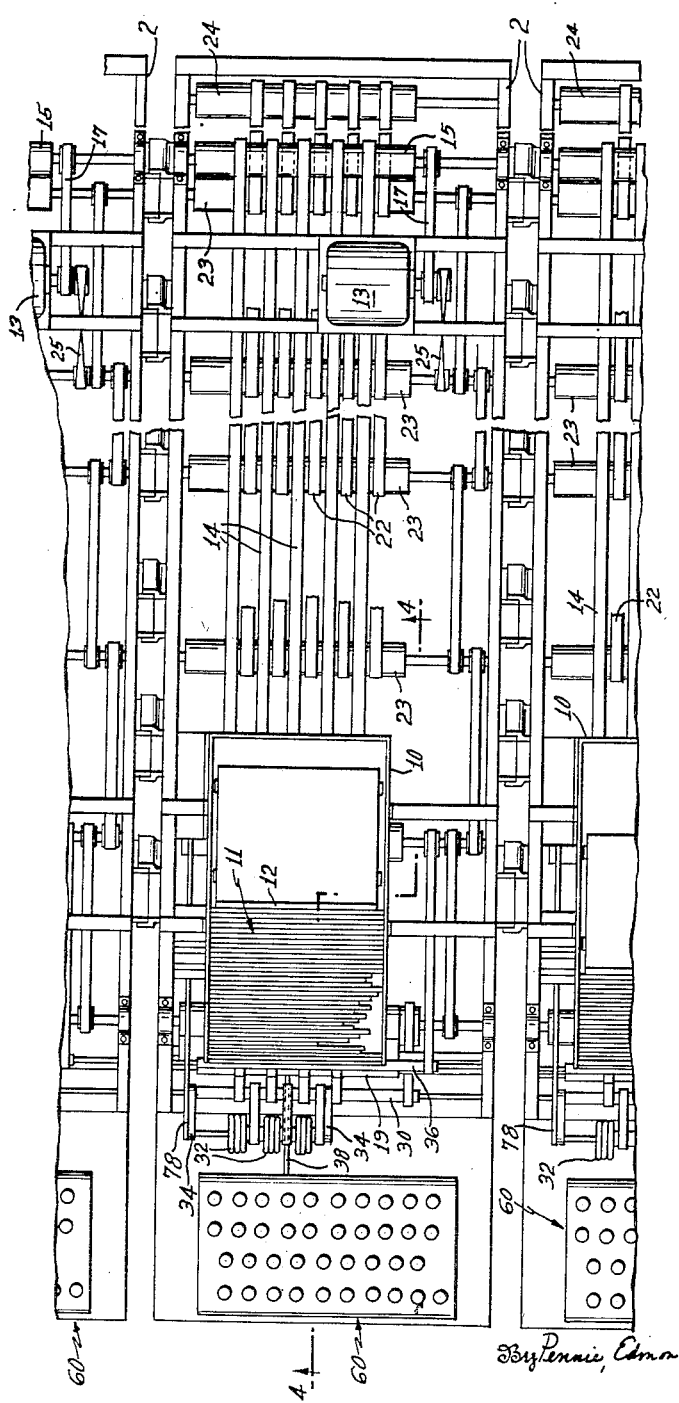
Figure 3:
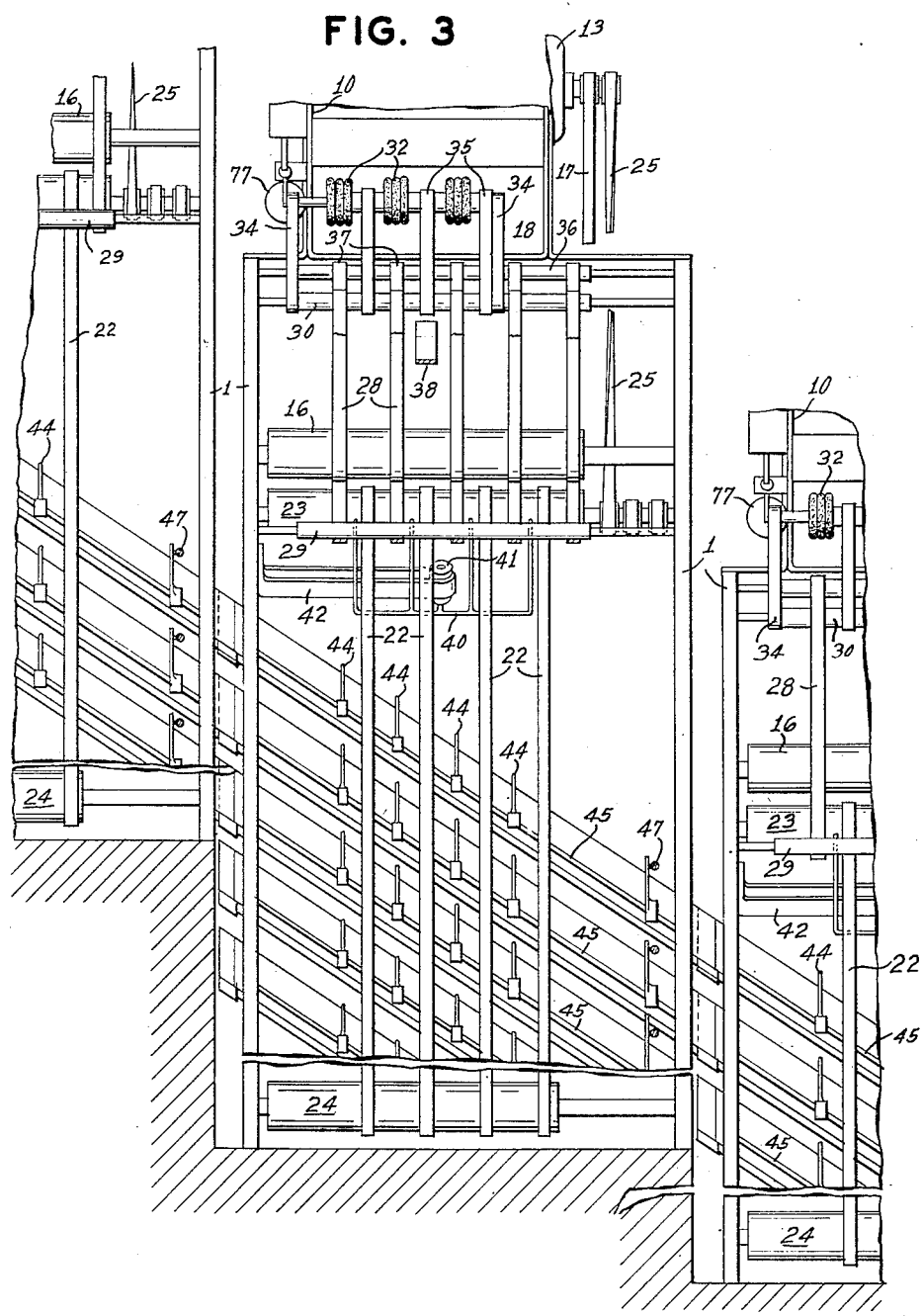
Figure 4:
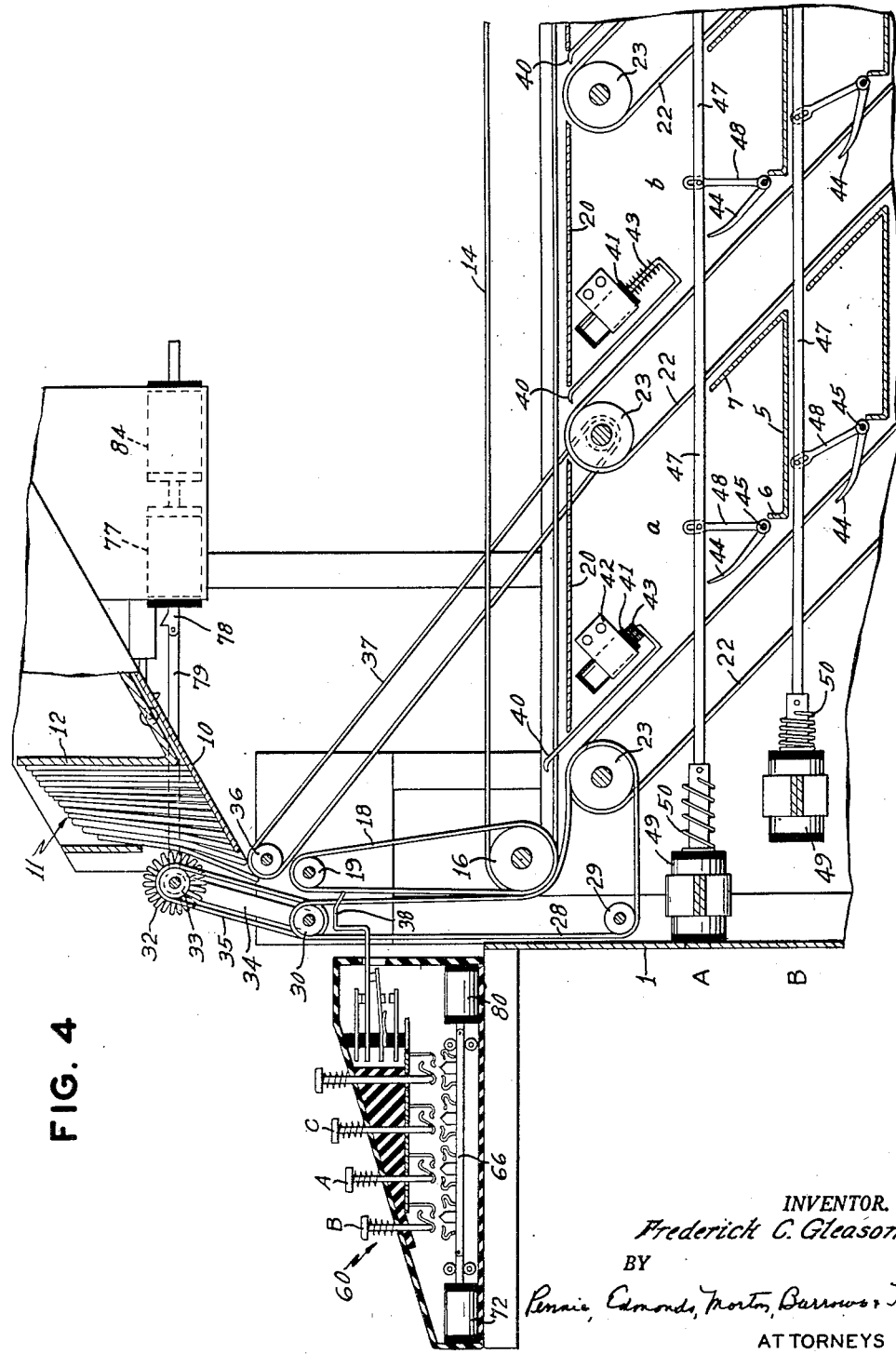

In the drawings:

Fig. 1 is a partial side elevational view showing the framework for supporting the various elements of one embodiment of the machine of this invention, Fig. 2 is a plan view of the machine shown in Fig. 1 and including portions of identical machines adapted to be used therewith, one lying on either side thereof, Fig. 3 is a sectional view taken along line 3—3 of Fig. 1, also showing portions of identical machines placed in stepped relation, one on each side of the main machine, Fig. 4 is an enlarged partial elevational view taken along line 4—4 of Fig. 2.

Figure 5:
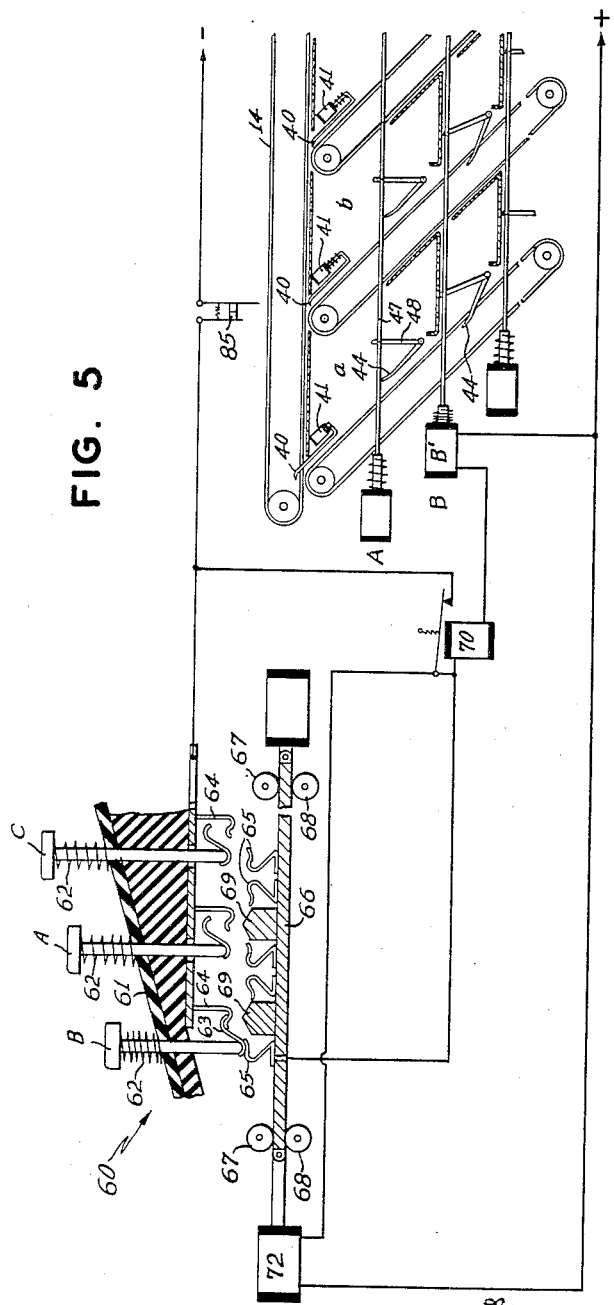
Figure 6:
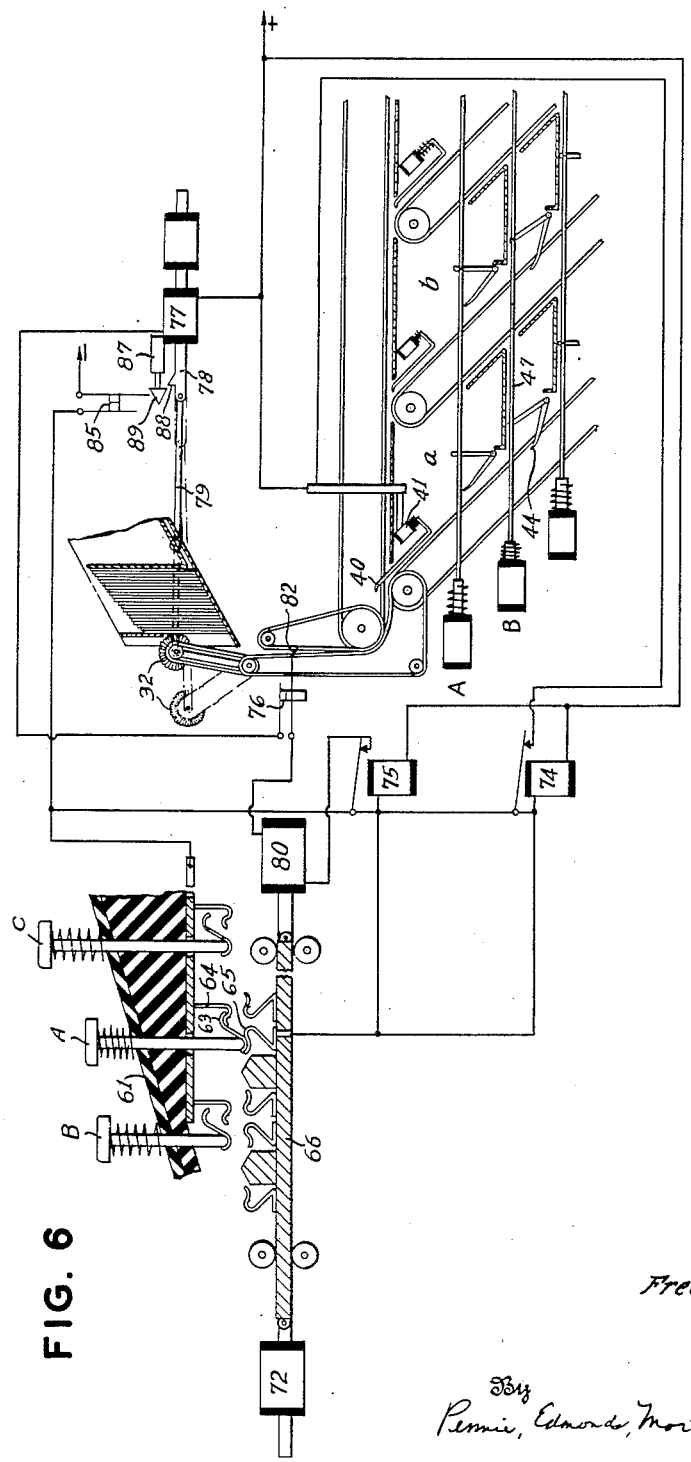
Figure 7:
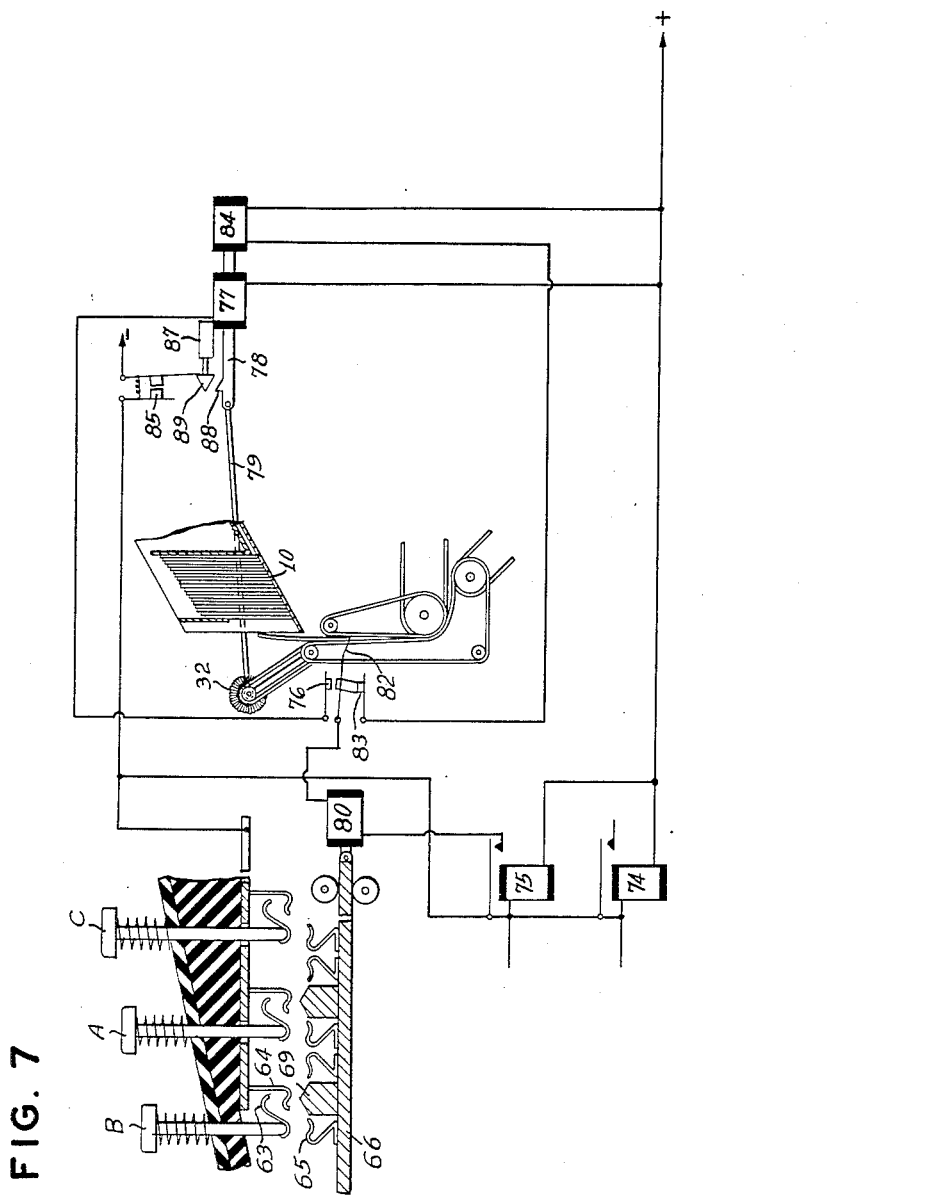

Fig. 5 is a diagrammatic view showing a portion of the machine and the operating circuits completed by the depression of the first-operated key, Fig. 6 is a diagrammatic view of a portion of the machine and the circuits completed by the depression of the second-operated key, Fig. 7 is a diagrammatic view of a portion of the machine showing the feed release and return circuits, and Fig. 8 is a schematic representation of the combined operating circuits of the machine.

Referring now to the drawings and particularly to Figs. 1–4, any suitable framework may be used to support the sorting machine mechanism. The basic framework shown, being but one type which will satisfactorily serve the purpose, comprises a plurality of vertically disposed members 1 connected by various horizontal members 2 and plate members 3 to form a rigid, sturdy structure.

Within this framework and supported thereby is a plurality of chutes 4, each consisting of a base 5 having a lip 6 and back wall 7. The chutes 4 are arranged in generally vertical rows a, b, c, d, etc. longitudinally of the machine, corresponding ones being at the same horizontal level. Thus, are formed horizontal rows A, B, C, D, etc. Each chute is additionally itself inclined in a direction transversely of the sorting machine at an angle of approximately 45° with the horizontal, or even possibly greater. The omission of a front side wall for each chute is necessary in order to provide means for the entrance of an article to be sorted into such chute and end walls for each are omitted to permit the article to slide sidewise out therefrom.

Mounted above the above-mentioned framework, adjacent one end thereof and supported thereby, is an article feeding or supply trough 10, one end of which is considerably elevated from the other to facilitate the feeding of the articles to the lower end and from there to conveying means of the sorting machine. The articles 11 to be sorted, in this case letters, are placed in the trough in a generally vertical position with the faces thereof carrying the printed matter or address facing the lower end of the trough. A weight-follower 12 rides in the trough above the letters and is adapted to maintain them in their vertical positions and to supply the necessary force to assure that they will move towards the lower end of the trough.

The feeding and conveying means of the sorting machine comprises a series of power driven belts (Fig. 2) all preferably and most economically driven from a single source of driving power, for instance, an electric motor 13 suitably supported above the opposite end of the basic framework from that at which the supply trough is mounted. Horizontally-disposed conveyer belts 14, supported by driving rollers 15 and 16 are mounted to ride above and across the upper ends of the generally vertical rows of chutes, the driving rollers being supported on horizontal members 2 of the framework. These horizontal conveyer belts are positively driven by the motor 13 through driving belt 17 and serve to forcibly transfer letters supplied to them, lengthwise of the machine and above the generally vertical rows of the chutes. The supporting roller 16 provides driving power for one set of initial feed belts 18 supported by it and auxiliary shaft 19. Plates 20 are mounted below the lower flights of the horizontal conveyer belts and are adapted to support the letters to be sorted during the period of their conveyance by such horizontal conveyer belts. Each generally vertical row of chutes is also provided with positive conveying means in the form of conveyer belts 22 inclined at the same angle as are the generally vertical rows of chutes and serving to convey a letter, when properly diverted from its horizontal path of travel to a chute of the generally vertical row depending upon the operation of the sorting machine as will be subsequently described. These generally vertical conveyer belts are supported by driving drums 23 and idler drums 24 which, by suitable belt connecting means as shown in Fig. 2, are all driven from the single source of power, motor 13, through power belt 25. It should be noted here that the conveyer belt drive supplied by the power belt 25 is opposite in direction to that supplied to the horizontal conveyer belts, and this is necessary in order that the letters to be conveyed by the generally vertically disposed conveyer belts may be so conveyed by the right hand flight of each, as seen in Fig. 4.

The second set of initial feed belts 28 is driven and supported by means of attachment to one of driving drums 23 for the generally vertical conveyer belts and is additionally supported by idling shaft 29 supported by the framework and shaft 30. Thus, the adjacent flights of the initial feed belts move in the same direction, that is downwardly, and cooperate in conveying a letter to be sorted. Also mounted on shaft 30 is a swinging rotary feed mechanism, comprising a number of friction discs 32 mounted upon a shaft 33 carried by a framework 34 which is mounted on supporting shaft 30. This swinging rotary feed mechanism is adapted to be pivoted about shaft 30, as will be subsequently described, in order to bring the friction discs into contact with the letters carried in the supply trough and to feed a letter from the supply trough into and between the generally vertically disposed flights of the sets of initial feed belts and thereby begin it on its path of travel through the sorting machine. Driving belts 35, driven by connection to shaft 30, supply driving power to disc-carrying shaft 33.

To assist in assuring the feeding of but one letter at a time, a counter-rotating wiper 36 is mounted adjacent the point of entrance of the letter into the initial feed belts, such rotating wiper being driven by power belt 37 in a direction opposite to that of the initial feed belts and the friction discs of the swinging rotary feed mechanism, thereby serving to positively prevent any letter or the like other than that being acted upon by the friction discs from being fed into the initial feed belt. This rotation of the wiper is accomplished by the connection of its power supplying drive belt 37 to one of driving drums 23. Also provided to assure single feed of articles is a feed cut-off trigger mechanism 38 which is tripped each time a letter is fed through the initial feed belts and results in the pivoting of the swinging rotary feed mechanism to inoperative position as will be subsequently described. The trigger mechanism is positioned a distance from the friction discs of the feed mechanism less than the width of the narrowest letter to be sorted thereby assuring discontinuance of the feeding before the friction discs contact the next letter.

The framework provided for supporting the swinging rotary feed mechanism supporting shaft and the counter-rotating wiper shaft as well as the idler shaft of the first-mentioned set of initial feed belts is shown in Fig. 1 of the drawings and comprises conventional members supported by the basic framework of the sorting machine.

A letter fed to the initial feed belts is carried thereby downwardly and fed thereby to the lower flights of the horizontal conveying belts by which, as has been above indicated, it is conveyed longitudinally of the machine above the upper ends of the generally vertical rows of chutes. Each generally vertical row of chutes is provided with a claw-like trap 40 operated by a solenoid 41. The solenoids 41 are supported by brackets 42 from the framework below the article supporting plates 20 in such a manner that the fingers of the trap are closely adjacent the upper end of the effective flights of the generally vertically disposed conveyer feed belts. The traps are adapted to be operated in a direction generally parallel to the generally vertical conveyer belts, the ends of the fingers of the trap being adapted to project beyond the plane of the letter-supporting plates and between the horizontally disposed feed belts, thereby intercepting letters conveyed by horizontal feed belts and diverting their direction of movement from the horizontal path into a generally vertical path. In order to realize such operation, the trap-operating solenoid must be energized, in which case the solenoid supported arm of the trap is drawn into the solenoid against the pressure of spring 43, thereby accomplishing the desired projection of the trap fingers into the spaces between the horizontal feed belts. When deenergized, springs 43 will obviously return the traps to their inoperative positions.

The generally vertical feed belts having received letters diverted from a horizontal path of travel through the operation of the above-described traps, convey such letters downwardly past the substantially open mouths of the chutes of the particular rows which they serve. For completion of the sorting operation the letters must be delivered to a particular chute from their generally vertical path of travel. This is accomplished by chute traps comprising suitably shaped fingers 44 mounted on shafts 45 and adapted to have their tips projected into the spaces between the belts of the generally vertical conveyers and to thereby intercept and divert letters, being carried by such conveyer, into the chutes. The finger supporting shafts 45 are mounted adjacent the substantially open mouths of the chutes and are supported by the side members of the framework which support the chutes themselves. The turning of the finger supporting shafts and the consequent movement of the fingers into operative position are accomplished by rods 47 operatively connected thereto by connecting members 48. Rods 47 are conveniently supported by the framework and may be longitudinally reciprocated by means of solenoids 49 and springs 50 attached thereto. The solenoid additionally may be conveniently supported in any manner from the framework. Upon the energization of any particular solenoid 49, its accompanying rod 47 is drawn towards it, thereby serving to move the corresponding trap fingers into operative position through connecting members 48. When the solenoid is subsequently deenergized, its spring will serve to return rod 47 to its normal position, and thereby the corresponding trap fingers to their inoperative position.

While a particular means and manner for supporting the chute traps and operating members has been shown in the drawings, it should be understood, of course, that any type of mounting may prove equally satisfactory, but it perhaps should be pointed out that no means for mounting such apparatus will be satisfactory if it will in any way obstruct the ends of the chutes and thereby prevent the proper entrance of letters thereinto through the upper end or the proper emission of letters therefrom through the lower end, such entrance and emission being all important to the subject of this invention as will be subsequently pointed out at length.

As indicated above in the preamble of the specification, the sorting machine of the present invention is intended to be operated in accordance with the printed matter carried on the face of the article to be sorted, certain characters of the printed matter when typed on a keyboard, serving to determine to which of the plurality of chutes the article to be sorted will be delivered. While the electric circuit arrangement of the machine, as will be described and disclosed herein, has been designed to operate the machine to sort articles according to any two distinguishing characters of the printed matter, it is contemplated, of course, that the electrical system with obvious modifications may be adapted to operate the machine in accordance with three, four or more distinguishing characters, and the fact that two only have here been chosen for illustrative purposes is not to be construed as limiting. The two distinguishing letters or characters of the printed matter carried on the faces of the articles to be sorted may be any two. For instance, in sorting mail, the first two letters of the street name may serve as the distinguishing characters.

The various electrical circuits (Figs. 5–8) for operating the sorting mechanism, including the swinging rotary feed mechanism, the horizontal trap-operating solenoids, and the chute trap-operating solenoids are controlled and actuated by a keyboard 60 very similar in the arrangement of letters of the alphabet and numerals to that of any standard typewriter keyboard. The keys, only several of which are shown, for instance, A, B, and C, are formed of insulating material and are supported in a plate member 61 also formed of insulating material. Each key is provided with a spring 62 for normally maintaining it in inoperative position and each has on its lower end an electrically conductive member 63. Adjacent each key and supported by the plate member is one half 64 of a make-and-break electric switch connected to one pole of a source of electric current. The other halves 65 of the make-and-break switches are carried by a reciprocable member 66 mounted for reciprocation between rollers 67 and 68 below the keys. These other halves of the make-and break switches, connected to the other pole of a source of electric current, are formed in pairs, one of each pair being adapted to be used when the key for such pair is depressed in accordance with the first distinguishing character of the printed matter carried on the face of a letter, and the other being adapted to be used when the key is depressed in accordance with the second distinguishing character of the printed matter. Upon depression of a key, the upper and lower halves of a particular make-and-break switch are connected by the electrically conductive member carried upon the lower end of such key. As will be described below, when the first key is depressed in accordance with the first distinguishing character of the printed matter and makes contact between an upper switch half 64 and one of a pair of lower switch halves 65, the member supporting the lower halves of the make-and-break switches will be moved in one direction to set up the other lower switch halves of the pairs in preparation for the depression of a second key in accordance with the second distinguishing characteristic of the printed matter. Because of such an arrangement of make-and-break switches, it is completely immaterial to the proper operation of the sorting machine whether or not the second distinguishing character be the same as the first. However, a cam portion 69 is provided between each pair of lower switch halves to positively return a depressed key to its inoperative position upon the reciprocation of switch carrying member, thereby avoiding the contacting of both lower switch halves of a pair upon the single depression of a key.

Referring now to Fig. 5, the effect upon the sorting machine of the depression of a key of the keyboard representing the first distinguishing character of the printed matter carried by the letter to be sorted will be described. Each horizontal row of chutes will receive letters having the same distinguishing character in the printed matter carried on their faces. For instance, the horizontal row of chutes which has been labeled B will receive all letters having as their first distinguishing character the letter B. The generally vertical rows of chutes will receive letters or the like in accordance with the second distinguishing character of the printed matter carried on their faces. For instance, the row labeled *a* will receive all letters having as their second distinguishing character the letter *a*.

As shown in Fig. 5, upon the depression of key B a keyboard make-and-break switch will be made thereby effecting the operation of relay 70. This relay 70 will be maintained operative until broken as will be subsequently pointed out. As a result of the making of relay 70, solenoid B' will be energized and the chute traps 44 of row B actuated, the ends of their fingers being projected into spaces between the belts of the generally vertical conveyers and, therefore, being in a position to divert any letter, being carried by the conveyer belts, into a chute of the horizontal row designated B. Additionally, the making of relay 70, serves to energize solenoid 72, which in turn causes the reciprocable member of the keyboard mechanism to move in one direction, setting up its switch halves for depression of a key in accordance with the second distinguishing character of the printed matter on the face of the letter to be sorted. It should be noted that the major circuit set up by the depression of a key in accordance with a first distinguishing character has no effect whatever upon the feeding of the letter into the sorting mechanism of the machine, the only effect of such first letter key depression being to set up the traps of one row of horizontal chutes and the energization of the solenoid responsible for setting up the lower portion of the keyboard for second letter key depression.

Referring now to Fig. 6, the effect of the depression of a key in accordance with the second distinguishing character of the printed matter will now be described. For instance, if the second distinguishing character were *a*, the A key of the keyboard would be depressed and a second major circuit set up. Such depression of key A serves to energize relays 74 and 75. Through the energization of relay 74, current is supplied to one of the horizontal trap-operating solenoids; in this case that one supported above the row of chutes designated *a*. The operation of this solenoid results in the projection of the claw-like fingers of the trap, carried thereby, into the path of horizontal travel of letters carried by the horizontal conveyer. Thus, any letter fed into the conveying means of the sorting machine will be intercepted by the fingers of this horizontal trap and diverted from its horizontal path of travel and carried along a generally vertical downward path by the generally vertical conveyer serving the chutes of the row designated a. Such letter will further be diverted from its diagonal path of travel by the adjacent trap of row B, which along with all other traps of row B has been set up as pointed out above, and it will finally be delivered to a particular chute which will receive all letters or the like having as their first distinguishing character B and their second distinguishing character a. As pointed out above, the depression of key A also energizes relay 75 thereby supplying current through make-and-break switch 76 to solenoid 77. Solenoid 77, through members 78 and 79, is connected with the swinging rotary feed mechanism of the sorting machine and upon energization causes such swinging rotary feed mechanism to pivot about its pivotal axis and to feed a letter from the supply trough into the initial feed belts, the counter-rotating wiper and the hereinafter described feed cut-off trigger mechanism assuring single feed.

Referring to Fig. 7, there is shown diagrammatically what may be called the feed release and return circuit of the electrical control system for the sorting machine. Herein it will be noted that the energization of relay 75 as well as causing the actuation of solenoid 77, further causes the actuation of solenoid 80. Such solenoid 80 supplies the necessary force for the return of the lower half of the keyboard to its normal position thereby setting it up for the depression of a key in accordance with the first distinguishing character of the printed matter carried by the next letter to be sorted. In order that solenoid 80 may perform its function, some electrical or mechanical system must be provided to allow it to do so, taking into account the effect of solenoid 72 on the reciprocable lower portion of the keyboard. As stated, solenoid 72 is maintained energized throughout one operation of the machine in the arrangement shown. Therefore, its effect on the reciprocable portion of the keyboard must be overcome and this is accomplished in the arrangement shown by having solenoid 80 of sufficiently greater strength than solenoid 72 to do so. However, other arrangements, such as means for deenergizing solenoid 72 when the lower portion of the keyboard reaches the terminal of its travel toward solenoid 72, are contemplated and the fact that different strength solenoids are here provided to accomplish the solution of the problem is not be construed as limiting as it is recognized that many other means might be provided to accomplish this end with equal satisfaction. As the letter fed to the initial feed belts of the sorting machine passes through them, it contacts the trigger 82 of the feed cut-off trigger mechanism thereby breaking switch 76, resulting in the deenergization of solenoid 77 and the making of make-and-break switch 83, which in turn results in the energization of solenoid 84. Solenoid 84 is also connected to the swinging rotary feed mechanism through members 78 and 79, but, contrary to the action of solenoid 77 thereupon, it serves to force member 78 out therefrom and to return the swinging rotary feed mechanism to its inoperative position. It is contemplated that trigger 82 be so positioned with respect to friction discs 32 of the swinging rotary feed mechanism that the distance therebetween be less than the width of the narrowest letter to be sorted so that the swinging rotary feed mechanism will be returned to its inoperative position before its friction discs can contact the next letter to be sorted subsequent to that already fed to the sorting mechanism, thereby assuring the feed of only one letter during one operative cycle of the sorting mechanism.

Adjacent the solenoids 77 and 84 is a make-and-break switch 85 carried by one of the main supply lines for electric current. Such switch 85 is of the type that is always closed except when sprung open by an external force, and upon the discontinuance of such external force, it will return to its closed position. Associated with switch 85 is a conventional dash pot or time-delay device 87, so positioned and arranged that it may be operated by a member 88 carried by and projecting from member 78. The dash pot 87 is so designed that the head 89 of its projecting member may pass switch 85 having no effect thereon when moved in a direction to the left as seen in Fig. 7, except perhaps to tend to force it tighter closed, but when returned by the dash pot operating mechanism it does serve to break switch 85. This projecting head member 89 of the dash pot is projected in a leftwardly direction by protruding member 88 when solenoid 84 is energized to return the swinging rotary feed mechanism to its inoperative position. Thus, the dash pot or time-delay device is set up and automatically begins to return its projected head member 89 rightwardly and at a particular time such member will engage a projection of switch 85 and thereby momentarily breaking such switch. When such switch is broken, relays 70, 74 and 75 are deenergized, thereby deenergizing all of the circuits of the electrical operating apparatus of the sorting machine except, of course, that of the electric motor. Such relays will not again be energized and set up until the keys of the actuating keyboard are again depressed in accordance with the printed matter contained on the face of the next letter to be sorted. It will be seen that the master switch 85 need only be broken momentarily and, therefore, the dash pot is designed to do just this, allowing the switch to be made again after the momentary breaking thereof.

The letter which has been fed into the initial feed belt will, as has been described above, proceed along a path of travel through the machine until it is deposited in the proper chute. It will, of course, be clear that the proper setting of the dash pot or time-delay device should be for the time required for a letter to be fed into the machine and to travel through the machine to the chute farthest from the letter feeding position.

It is contemplated that the only limitation in the speed of operation of the above-described sorting machine will be that imposed by the ability of the operator to operate the keyboard, as the speed of all the conveyer belts can be maintained, and satisfactorily so, at a speed sufficiently great to offer no limitation whatsoever.

The feeding mechanism and actuating mechanism therefor are claimed in my copending application Ser. No. 332,313, filed January 21, 1953.

As indicated in the preamble of the specification, it is contemplated that such machines will be used in groups or batteries, the machines of a group or battery being placed side by side at stepped levels with respect to one another as shown in Fig. 3. Additionally pointed out was the fact that the chutes of a machine are all inclined at an angle transversely of the machine to facilitate the emission by gravity of letters deposited in any one out from the end thereof and into the corresponding chute of the next lower machine in a group. The chutes are further so designed that they will extend beyond the outer confines of the supporting framework of the sorting machine and, therefore, beyond any of the operating mechanism of the machine and the upper end of each is widened or swaged out. When arranged in groups or batteries, as shown in Fig. 3, the lower ends of the chutes of one machine enter the widened upper ends of those of the next lower machine. The machines of a particular group or battery are identical and the letters sorted by each are so sorted that corresponding chutes of each machine will receive the same type letters, that is, all those having particular distinguishing characters contained by the printed matter on their faces. Thus, for instance, all letters with distinguishing characters Ba will be delivered to B*a* chutes, which are similarly situated in each machine. It will, therefore, be seen that the B*a* letters sorted by one machine will pass from such machine into the B*a* chute of the next lower machine and from there along with the B*a* letters sorted by that machine into the B*a* chutes of the still lower machine and so on until they are passed through the lowest machine of any one group. Hence, instead of being required to collect sorted material from each machine separately, all material of a like kind sorted by all the machines comprising one battery or group may be collected together.

The fact that all the machines of a group are identical permits the removal of any one for routine maintenance and the insertion of a substitute machine to take its place, and thus, the removal of a single machine will not result in the inoperativeness of a whole group, and further, one spare machine may be used for replacement purposes for a whole group, it being unlikely that more than one will require maintenance at any particular time. However, in the event that more than one does, it would be a simple matter to rearrange the remainder of the group so that they would continue to operate as a group rather than as single machines.

While the apparatus forming the basis of the invention has been disclosed rather specifically, it should be understood that various modifications and changes may be incorporated or made therein without departure from the invention. For instance, it is contemplated that the generally vertical rows of chutes and their accompanying conveyer means might be exactly vertical and that articles might be conveyed by the flights of the belts of such conveyer means opposite those which are shown in the drawings. In this case the chutes would necessarily be reversed to a position in which their substantially open mouths would face to the right instead of to the left as shown. It is even contemplated that the generally vertical conveyer means might be dispensed with altogether and guiding means be substituted in their place thereby depending upon gravity and the momentum given the articles by the horizontal conveying means to deliver them from the horizontal conveying means to the chutes. The scope of the invention should, therefore, be limited only to the extent set forth in the appended claims.

I claim:

1. In a sorting machine for mail and the like, a keyboard mechanism for operating said sorting machine which comprises a plurality of manually-operable keys, a support for said keys, a member which is reciprocable with relation to said support, a plurality of electrical contacts mounted on said support and said member, the contacts mounted on the support being connected to one pole of a source of electric current and the contacts mounted on the member being connected to the other pole of the source of electric current, means carried by each key which electrically connects a contact on the support to a contact on the member when a key is operated in one direction thereby completing an electric circuit, and means for reciprocating the reciprocable member to bring different contacts thereon into position for completion of different circuits by the means carried by each key.

2. A keyboard mechanism as set forth in claim 1 in which the means for reciprocating said reciprocable member is actuated by the completion of the electric circuit.

3. A keyboard mechanism as set forth in claim 1 in which the electrical contacts mounted on the reciprocable member are arranged in groups, one group for each key, in which the electrical contacts carried by the support are so positioned thereon that one of said contacts lies adjacent each key, and in which the means for reciprocating the reciprocable member is actuated by the completion of the electric circuit, said reciprocating means when actuated causing the reciprocable member to move to a new position whereby a subsequent movement of the key will electrically connect the contact on the support adjacent said key to a different contact of its corresponding group of contacts on the reciprocable member.

4. A keyboard mechanism which comprises a plurality of manually-operable keys, a support for said keys, a member which is reciprocable with relation to said support, a plurality of operating elements mounted on said reciprocable member each being adapted to be operatively engaged by one of said keys when the latter is moved in one direction, means for reciprocating the reciprocable member to bring different operating elements thereon into position for engagement by said keys, and means operatively interconnecting each element with said reciprocating means so that when an operating element is engaged by a key it causes operation of said reciprocating means to move said member.

5. A keyboard mechanism which comprises a plurality of manually operable keys, a support for said keys, a member which is reciprocable with relation to said support, a plurality of operating elements mounted on said reciprocable member and being adapted to be operatively engaged by said keys when the latter are moved in one direction, said elements being arranged in at least two groups, those of one group being adapted to be engaged by said keys when said reciprocable member is in one position and those of the other group being adapted to be engaged by said keys when the reciprocable member is in another position, means for reciprocating the reciprocable member, and means operatively interconnecting each element with said reciprocating means so that when it is engage by a key it operates said reciprocating means to move said member.

References Cited in the file of this patent

UNITED STATES PATENTS

| | | |
|---|---|---|
| 843,901 | Lewis | Feb. 12, 1907 |
| 1,961,871 | Caskey | June 5, 1934 |
| 2,153,401 | Tritle | Apr. 4, 1939 |